(12) United States Patent
Schwarz et al.

(10) Patent No.: US 9,032,826 B2
(45) Date of Patent: May 19, 2015

(54) BEVEL GEAR TRANSMISSION

(75) Inventors: Henry Schwarz, Brandenburg (DE); Thomas Koppe, Brandenburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 395 days.

(21) Appl. No.: 13/589,368

(22) Filed: Aug. 20, 2012

(65) Prior Publication Data

US 2013/0061702 A1     Mar. 14, 2013

(30) Foreign Application Priority Data

Sep. 9, 2011    (DE) .......................... 10 2011 082 406

(51) Int. Cl.
*F16H 1/14*    (2006.01)

(52) U.S. Cl.
CPC ............. *F16H 1/14* (2013.01); *Y10T 74/19688* (2015.01)

(58) Field of Classification Search
USPC .............................. 475/220, 230; 74/423, 424
See application file for complete search history.

(56) References Cited

U.S. PATENT DOCUMENTS

| | | | |
|---|---|---|---|
| 805,567 A | 11/1905 | Lindsay | |
| 2,129,580 A * | 9/1938 | Heslep | 475/247 |
| 2,133,112 A * | 10/1938 | Ormsby | 475/247 |
| 2,203,292 A * | 6/1940 | Best | 475/246 |
| 2,270,567 A | 1/1942 | Slider | |
| 3,344,687 A | 10/1967 | Stockton | |
| 4,277,985 A | 7/1981 | Kostello et al. | |
| 4,796,488 A * | 1/1989 | Hagin et al. | 475/230 |
| 5,183,445 A | 2/1993 | Alt | |
| 6,364,803 B1 * | 4/2002 | Barnholt et al. | 475/246 |
| 6,554,733 B2 * | 4/2003 | Niebauer | 475/230 |
| 7,485,065 B2 * | 2/2009 | Kearney | 475/230 |
| 8,157,692 B2 * | 4/2012 | Krude et al. | 475/230 |

FOREIGN PATENT DOCUMENTS

| | | |
|---|---|---|
| DE | 1 555 366 | 10/1970 |
| DE | 30 34 493 A1 | 4/1981 |
| DE | 41 01 327 C1 | 10/1991 |
| EP | 0 476 458 A1 | 3/1992 |

OTHER PUBLICATIONS

German Search Report Corresponding to DE 10 2011 082 406.5, Jun. 6, 2012.

* cited by examiner

*Primary Examiner* — David M Fenstermacher
(74) *Attorney, Agent, or Firm* — Davis & Bujold, P.L.L.C.; Michael J. Bujold

(57) ABSTRACT

A bevel gear drive (1) comprises a spur bevel gear (2) and a pinion which both mesh with one another. The spur bevel gear and the pinion are arranged within a housing (3). An abutment plate (4) is provided so as to avoid displacement of the spur bevel gear (2), under high operating loads. The abutment plate (4) is integrated in the housing (3) and supports the spur bevel gear (2) when forces, that can cause displacement of the spur bevel gear (2), act upon the spur bevel gear (2).

16 Claims, 2 Drawing Sheets

BEVEL GEAR TRANSMISSION

This application claims priority from German patent application serial no. 10 2011 082 406.5 filed Sep. 9, 2011.

FIELD OF THE INVENTION

The present invention concerns a bevel gear transmission comprising a spur bevel gear and a pinion that meshes with the spur bevel gear, which are accommodated in a housing.

BACKGROUND OF THE INVENTION

In the case of bevel gear drives, depending on the design and disposition, at high operating loads undesired displacements can take place between the spur bevel gear and the pinion because of the forces that act transversely to the plane of the spur bevel gear. In turn, these displacements impair the engagement characteristics between the spur bevel gear and the pinion, and this disadvantageously results in more severe loading of the teeth with the consequence of greater wear and increased damage.

EP 0476458 A1 describes a bevel gear drive consisting of a pinion and a spur bevel gear accommodated in a housing, which has a supporting device to protect the spur bevel gear in the event of overload. In this case the supporting device consists of a roller mounted to rotate in the housing and a roller track on the rear side of the spur bevel gear or part of it, wherein the clearance between the roller and the roller track is adjustable.

The roller is fitted onto an eccentric central section of a bolt, the two ends of the bolt being supported in the housing, with one end which is provided with a thread projecting out of the housing. Furthermore, according to EP 0476458 A1 the roller can be in the form of a roller bearing.

SUMMARY OF THE INVENTION

The purpose of the present invention is to indicate a bevel gear drive comprising a spur bevel gear and a pinion that meshes with the spur bevel gear, in which displacement of the spur bevel gear is avoided in a simple and inexpensive manner.

According to these a bevel gear drive is proposed, which comprises a spur bevel gear and a pinion that meshes with the spur bevel gear, which are arranged in a housing in which, to avoid displacement of the spur bevel gear under high operating loads, a circular-segment-shaped abutment plate is provided, which is integrated in the housing and which supports the spur bevel gear when forces act upon it that can cause its displacement.

The abutment plate is arranged in such manner that the contact between it and the outer diameter of the spur bevel gear when the spur bevel gear is being supported takes place on as large a diameter as possible, so that the supporting forces are minimized. The radius of curvature of the abutment plate preferably essentially conforms to the radius of curvature of the spur bevel gear in the area where the spur bevel gear comes into contact with the abutment plate while the spur bevel gear is being supported.

In a further development of the invention the abutment plate is arranged in the housing of the bevel gear drive in such manner that the spur bevel gear is supported at the point of its largest possible displacement, namely at the point that corresponds to tooth engagement between the pinion and the spur bevel gear.

Furthermore, the gap between the abutment plate and the spur bevel gear can be set by choosing an appropriate size for the abutment plate in the radial direction, such that under normal operating conditions the spur bevel gear does not come up against the abutment plate.

In a further development of the invention the abutment plate can be made integrally with the housing.

Thanks to the concept according to the invention, displacement of the spur bevel gear is avoided by means of only one additional component. A bevel gear drive constructed according to the invention can be used, for example, as a differential transmission in a motor vehicle.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

The structure of bevel gear drives is well known to those familiar with the subject, so that in the description of the figures only those components which are relevant from the standpoint of the invention will be described and explained in detail.

Figure 1:
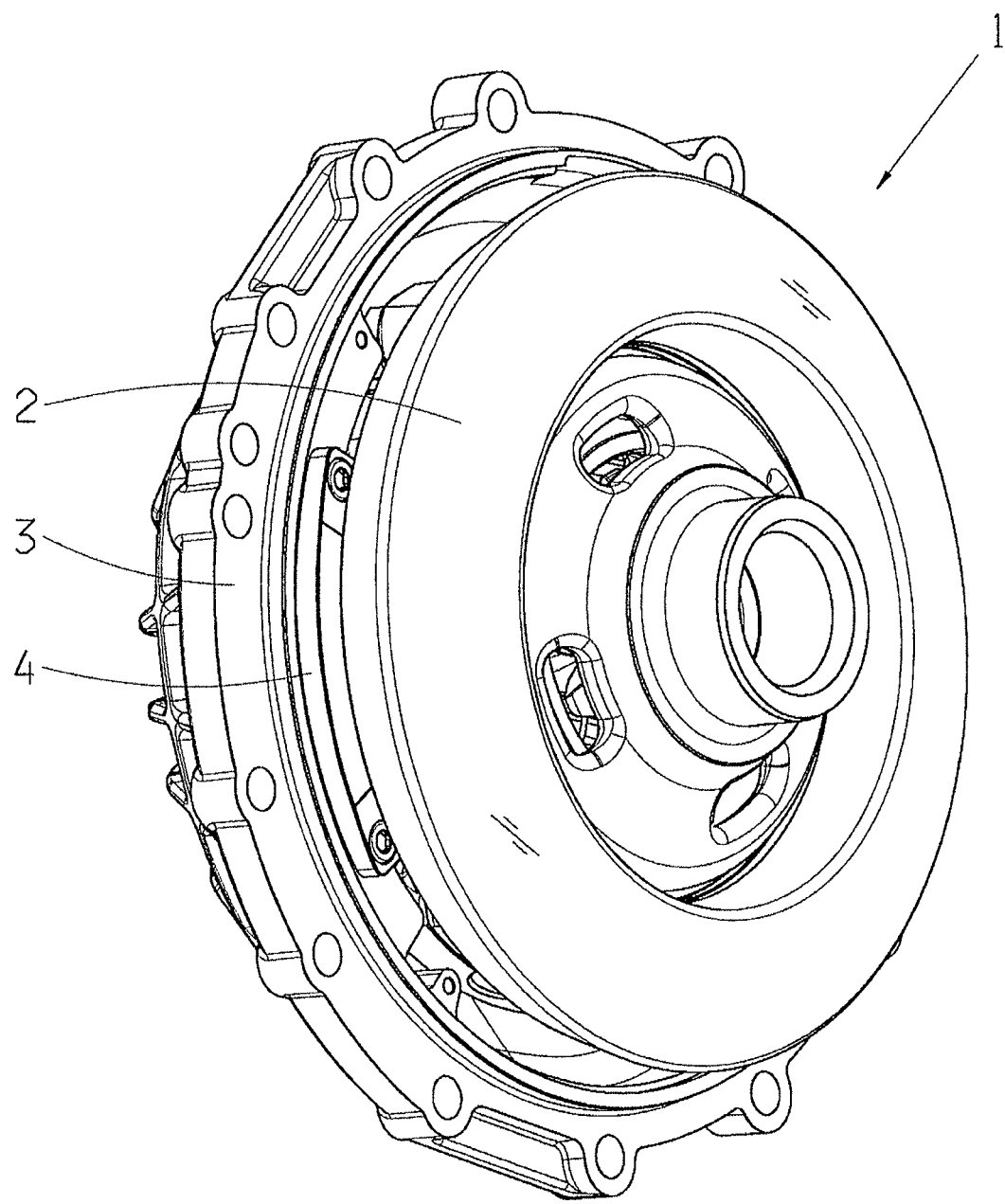
FIG. 1: A schematic, perspective representation of a bevel gear drive according to the invention.
Figure 2:
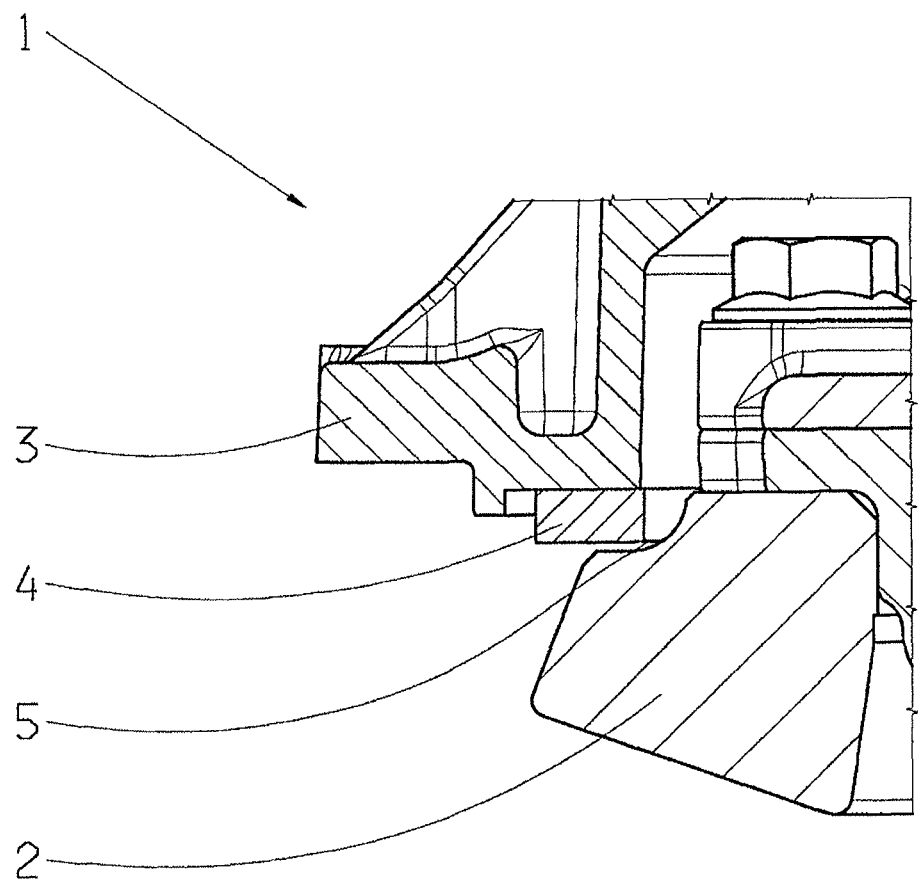
FIG. 2: A schematic sectioned view of part of the bevel gear drive shown in FIG. 1.

FIGS. 1 and 2 show a bevel gear drive 1. It comprises a spur bevel gear 2 which meshes with a pinion (not shown), and the spur bevel gear 2 and pinion are arranged within a housing 3.

According to the invention and referring to FIGS. 1 and 2, to avoid displacement of the spur bevel gear 2 during the operation of the bevel gear drive 1, a circular-segment-shaped abutment plate 4 is provided, which is integrated in the housing 3 of the bevel gear drive 1. The spur bevel gear 2 is supported by the abutment plate 4 whenever forces act upon it which could result in a displacement of the spur bevel gear 2.

The abutment plate 4 for supporting the spur bevel gear 2 is arranged in such manner, and is of a size such that when the spur bevel gear 2 is being supported, contact between the abutment plate 4 and the outer diameter of the spur bevel gear 2 takes place on as large a diameter as possible. In this case the radius of curvature of the abutment plate 4 corresponds essentially to that of the outer diameter of the spur bevel gear 2 in its contact area with the abutment plate 4 while the spur bevel gear 2 is being supported.

Under normal operating conditions there is a gap 5 between the abutment plate 4 and the spur bevel gear 2, so that there are no frictional losses. This is achieved by choosing appropriate dimensions for the abutment plate 2 in the radial direction.

Preferably, the abutment plate 4 is arranged in the housing 2 of the bevel gear drive 1 in such manner that the spur bevel gear 2 is supported at the point which corresponds to the tooth engagement between the pinion and the spur bevel gear 2, since it is at that point where the possible displacement of the spur bevel gear 2 can be greatest.

INDEXES

1 Bevel gear drive
2 Spur bevel gear
3 Housing

4 Abutment plate
5 Gap

The invention claimed is:

1. A bevel gear drive (1) comprising:
a spur bevel gear (2),
a pinion that meshes with the spur bevel gear (2),
the spur bevel gear (2) and the pinion being arranged in a housing (3), a circular-segment-shaped abutment plate (4) being fixedly secured to the housing (3), and the circular-segment-shaped abutment plate (4) comprising a support surface which, when the spur bevel gear (2) is in a first operating condition, is spaced from the spur bevel gear (2), even when high operating loads are present on the spur bevel gear (2); and
the spur bevel gear (2), during a second operating condition only when forces act upon the spur bevel gear (2) and result in axial displacement thereof, the spur bevel gear (2) being axially biased into engagement with the circular-segment-shaped abutment plate (4).

2. The bevel gear drive according to claim 1, wherein the abutment plate (4) is arranged such that contact between the support surface of the abutment plate (4) and an outer diameter of the spur bevel gear (2), during axial displacement of the spur bevel gear (2), occurs on a radially outer portion of the abutment plate (4).

3. The bevel gear drive according to claim 1, wherein a radius of curvature of the abutment plate (4) conforms to that of an outer diameter of the spur bevel gear (2), in an area where the spur bevel gear (2) comes into contact with the abutment plate (4) during axial displacement of the spur bevel gear (2).

4. The bevel gear drive according to claim 1, wherein the abutment plate (4) is arranged on the housing (3) of the bevel gear drive (1) such that the spur bevel gear (2) is supported at a point adjacent to a tooth engagement between the pinion and the spur bevel gear (2).

5. The bevel gear drive according to claim 1, wherein a size of the abutment plate (4), in a radial direction, is such that under normal operating conditions, the gap (5) exists between the abutment plate (4) and the spur bevel gear (2) so that the spur bevel gear (2) avoids contact with the abutment plate (4) in the first operating condition.

6. The bevel gear drive according to claim 1, wherein the abutment plate (4) Is made integrally with the housing (3).

7. A bevel gear drive (1) comprising:
a spur bevel gear (2),
a pinion that meshes with the spur bevel gear (2),
the spur bevel gear (2) and the pinion being arranged within a housing (3),
a circular-segment-shaped abutment plate (4) being fixed to the housing, and
a support surface of the abutment plate (4) being located adjacent and spaced from an outer diameter of the spur bevel gear such that during a first operating condition when the spur bevel gear (2) is operating under high load, the spur bevel gear (2) still remains spaced from the support surface of the abutment plate (4); and
during a second operating condition, the spur bevel gear is axial displaced towards, contacts and is supported by the support surface of the abutment plate so as to avoid further axial displacement of the spur bevel gear (2) when forces acting upon the spur bevel gear (2) result in axial displacement thereof.

8. The bevel gear drive according to claim 7, wherein the abutment plate (4) has a radius of curvature that is substantially identical to that of an outer diameter of the spur bevel gear (2), in an area where the spur bevel gear (2) contacts the abutment plate (4) when the spur bevel gear (2) is being supported by the support surface of abutment plate (4).

9. The bevel gear drive according to claim 7, wherein the abutment plate (4) is arranged on the housing (3) so as to support the spur bevel gear (2) at a point adjacent to tooth engagement between the pinion and the spur bevel gear (2).

10. The bevel gear drive according to claim 7, wherein a gap is located in a radial direction, between the abutment plate (4) and the spur bevel gear (2), so that when the spur bevel gear (2) operates under normal conditions, the gap (5) separates the spur bevel gear (2) from the abutment plate (4).

11. A bevel gear drive of a transmission comprising:
a housing;
a spur bevel gear;
a pinion having teeth meshing with teeth of the bevel gear for rotating the spur bevel gear with respect to an axis of the pinion;
the bevel gear and the pinion being arranged within the housing;
a circular-segment-shaped abutment plate being fixedly secured to a surface of the housing and the abutment plate comprising a support surface facing the spur bevel gear;
during a first operating condition of the bevel gear, the support surface of the abutment plate normally being spaced from the bevel gear by a gap so that the bevel gear remains spaced from the abutment plate; and
during a second operating condition of the bevel gear, the bevel gear being axially displaced toward and into engagement with the abutment plate so that the support surface of the abutment plate contacts and supports a portion of the bevel gear and thereby prevents further axial displacement of the bevel gear toward the housing.

12. The bevel gear drive according to claim 11, wherein the abutment plate is radially and axially located with respect to the bevel gear such that during the second operation condition of the bevel gear, the abutment plate contacts and supports the bevel plate only along a portion of the bevel plate; and
the portion of the bevel plate that is supported is located adjacent an outer diameter of the bevel plate.

13. The bevel gear drive according to claim 11, wherein a radius of curvature of the abutment plate conforms to an outer diameter of the spur bevel gear; and
the portion of the bevel plate that is supported is located along the outer diameter of the bevel plate.

14. The bevel gear drive according to claim 11, wherein the abutment plate is made integrally with the housing.

15. The bevel gear drive according to claim 11, wherein the abutment plate being located adjacent an outer diameter of the bevel gear such that, during the second operation condition when the bevel plate is operating under high load, the bevel gear contacts with and is supported by the abutment plate so as to avoid further axial displacement of the bevel gear.

16. The bevel gear drive according to claim 11, wherein the abutment plate has a radius of curvature that is identical to that of an outer diameter of the bevel gear.

* * * * *